_(12)_ United States Patent
Tanaka et al.

(10) Patent No.: US 10,762,761 B2
(45) Date of Patent: Sep. 1, 2020

(54) MONITORING ASSISTANCE SYSTEM, CONTROL METHOD THEREOF, AND PROGRAM

(71) Applicant: Omron Corporation, Kyoto (JP)

(72) Inventors: Kiyoaki Tanaka, Shiga (JP); Jumpei Matsunaga, Tokyo (JP); Shinji Takahashi, Shiga (JP); Tatsuya Murakami, Shiga (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/462,289

(22) PCT Filed: Nov. 28, 2017

(86) PCT No.: PCT/JP2017/042579
§ 371 (c)(1),
(2) Date: May 20, 2019

(87) PCT Pub. No.: WO2018/159039
PCT Pub. Date: Sep. 7, 2018

(65) Prior Publication Data
US 2019/0318600 A1 Oct. 17, 2019

(30) Foreign Application Priority Data
Mar. 2, 2017 (JP) ................................. 2017-039401

(51) Int. Cl.
*G08B 21/02* (2006.01)
*G06T 7/20* (2017.01)
(Continued)

(52) U.S. Cl.
CPC ............... *G08B 21/02* (2013.01); *G06T 7/20* (2013.01); *G08B 25/006* (2013.01); *A61G 7/012* (2013.01)

(58) Field of Classification Search
CPC ................................... A61B 1/00; G06K 1/00
See application file for complete search history.

(56) References Cited

U.S. PATENT DOCUMENTS

2013/0215248 A1  8/2013  Ishii et al.
2016/0125620 A1* 5/2016  Heinrich ................. G06T 7/246
                                                                 382/103
(Continued)

FOREIGN PATENT DOCUMENTS

JP  2012-71003 A   4/2012
JP  2012-170483 A  9/2012
JP  2015-172889 A  10/2015

OTHER PUBLICATIONS

International Search Report issued in Application No. PCT/JP2017/042579, dated Feb. 27, 2018 (1 page).
(Continued)

*Primary Examiner* — Shirley Lu
(74) *Attorney, Agent, or Firm* — Osha Liang LLP (57) ABSTRACT

A watching assistance system that assists watching over a subject on a bed, the watching assistance system includes: a detector configured to detect a position of a predetermined region of the subject from the image captured by an imaging device; a determination unit configured to determine whether the subject raises oneself up based on the position at which the predetermined region of the subject is detected; and an output unit configured to provide notification when the determination unit determines that the subject raises oneself up. Based on a bed region in the image, a lying region is set to an existing range of a predetermined region at a lying time, and a raising-up region is set to an existing range of the predetermined region at a raising-up time. The lying region and the raising-up region are disposed at an interval. The determination unit determines that the subject raises oneself up when a condition that predetermined region (Continued)

of the subject is detected in the raising-up region after the predetermined region of the subject is detected in the lying region is satisfied.

6 Claims, 10 Drawing Sheets

(51) Int. Cl.
*G08B 25/00* (2006.01)
*A61G 7/012* (2006.01)

(56) References Cited

U.S. PATENT DOCUMENTS

2016/0171337 A1* 6/2016 Okada .................. G06K 9/4661
    382/199
2017/0053401 A1* 2/2017 Hata ...................... A61B 5/107
2018/0192923 A1* 7/2018 Fu ......................... A61B 5/743

OTHER PUBLICATIONS

Written Opinion issued in International Application No. PCT/JP2017/042579, dated Feb. 27, 2018 (6 pages).

Muramoto, Kimitaka; "Technology to Recognize Patient Status Using an Image Sensor;" Image Laboratory; Mar. 10, 2015; vol. 26; No. 3; pp. 60-64 (8 pages).

* cited by examiner

MONITORING ASSISTANCE SYSTEM, CONTROL METHOD THEREOF, AND PROGRAM

TECHNICAL FIELD

The present invention relates to a technique of assisting watching over a subject on a bed.

BACKGROUND ART

In order to prevent a fall accident from a bed, there is a system that assists watching over a patient in a hospital or a nursing facility. Patent Document 1 proposes a system that detects a patient's head from an image captured by a camera installed obliquely above the bed, and determines raising-up action when the head exceeds a boundary line set on the bed. Patent Document 2 proposes a system that detects a moving direction of the patient from the camera image, and determines a current state of the patient based on the combination of the moving direction of the patient and the past state (going-to-bed state/raising-up state/getting-out-of-bed state/absent state).

PRIOR ART DOCUMENTS

Patent Documents

Patent Document 1: Japanese Unexamined Patent Publication No. 2012-071003
Patent Document 2: Japanese Unexamined Patent Publication No. 2012-170483

SUMMARY OF THE INVENTION

Problems to be Solved by the Invention

As described above, an attempt to detect motion or a state of a person from a camera image to use the motion or state for the watching assistance has conventionally been made. However, in the method for making a raising-up determination based on whether the head position exceeds the boundary line as in Patent Document 1, there is a possibility that the head position frequently crosses the boundary line to provide raising-up notification many times over in the case that the patient takes a posture in which the head just exists on the boundary line. For example, such a phenomenon may be generated when an upper body is slightly raised by a reclining function of the bed. When a false alarm of the raising-up notification is continued, it unnecessarily bothers the nurse and the like, and reliability of the system is significantly decreased.

The present invention has been made in view of the above-described circumstances, and an object of the present invention is to provide a technique of improving the reliability of the raising-up determination of a subject on the bed to prevent the false alarm of the raising-up notification.

Means for Solving the Problem

In order to achieve the above object, in a method of the present invention, the lying region and the raising-up region are disposed at an interval, and the wake-up notification is provided in the case that a condition that the subject is detected in the raising-up region after the subject is detected in the lying region is satisfied.

Specifically, according to a first aspect of the present invention, a watching assistance system that assists watching over a subject on a bed, the watching assistance system includes: an image acquisition unit configured to acquire an image captured by an imaging device; a detector configured to detect a position of a predetermined region of the subject from the image acquired by the image acquisition unit; a determination unit configured to determine whether the subject raises oneself up based on the position at which the predetermined region of the subject is detected; and an output unit configured to provide notification when the determination unit determines that the subject raises oneself up. Based on a bed region in the image, a lying region is set to an existing range of a predetermined region at a lying time, and a raising-up region is set to an existing range of the predetermined region at a raising-up time, the lying region and the raising-up region are disposed at an interval, and the determination unit determines that the subject raises oneself up when a condition that predetermined region of the subject is detected in the raising-up region after the predetermined region of the subject is detected in the lying region is satisfied.

With this configuration, a margin is provided between the lying region and the raising-up region, so that the false alarm or frequent provision of the raising-up notification that becomes a problem in the conventional system can be prevented, the false alarm or frequent provision of the raising-up notification being generated by frequent coming and going between the lying region and the raising-up region of the head position. Thus, the reliability of the raising-up determination can be improved.

The watching assistance system may further include: a reclining detector configured to detect that a change in a reclining angle of the bed; and a region setting unit configured to change settings of the lying region and the raising-up region according to the bed region after the change in the reclining angle when the reclining detector detects the change in the reclining angle.

Consequently, the change in the reclining angle of the bed is automatically detected, and the settings of the lying region and the raising-up region are adaptively changed. Thus, the high-reliability raising-up determination can be made regardless of the reclining state of the bed, and the false alarm of the raising-up notification caused by reclining can be prevented.

In the watching assistance system, the reclining detector may determine the change in the reclining angle when movement of the predetermined region of the subject satisfies a predetermined condition. Alternatively, the reclining detector may determine the change in the reclining angle when a contour shape of the bed changes.

The present invention can be recognized as a watching assistance system having at least a part of the above configuration and function. The present invention can also be recognized as a watching assistance method or a watching assistance system control method including at least a part of the above processing, a program causing a computer to perform these methods, or a computer-readable recording medium in which the program is non-transiently recorded. The above configurations and processes can be combined with each other as long as a technical contradiction is not generated.

Effect of the Invention

In the present invention, the reliability of the raising-up determination of the subject on the bed can be improved to prevent the false alarm of the raising-up notification.

MODES FOR CARRYING OUT THE INVENTION

The present invention relates to a technique of assisting watching over a subject on a bed. The technique can be applied to a system that automatically detects getting-out-of-bed and rising behaviors of the patients or those dependent on care in a hospital or nursing facility, and provides necessary notification when a dangerous state is generated. For example, the system can preferably be used to assist watching over elderly people, patients with dementia, and children.

Hereinafter, an example of a preferred aspect for carrying out the present invention will be described with reference to the drawings. However, a configurations and an operation of a device described in the following embodiment are merely examples, and the scope of the present invention is not limited thereto.

Figure 1:
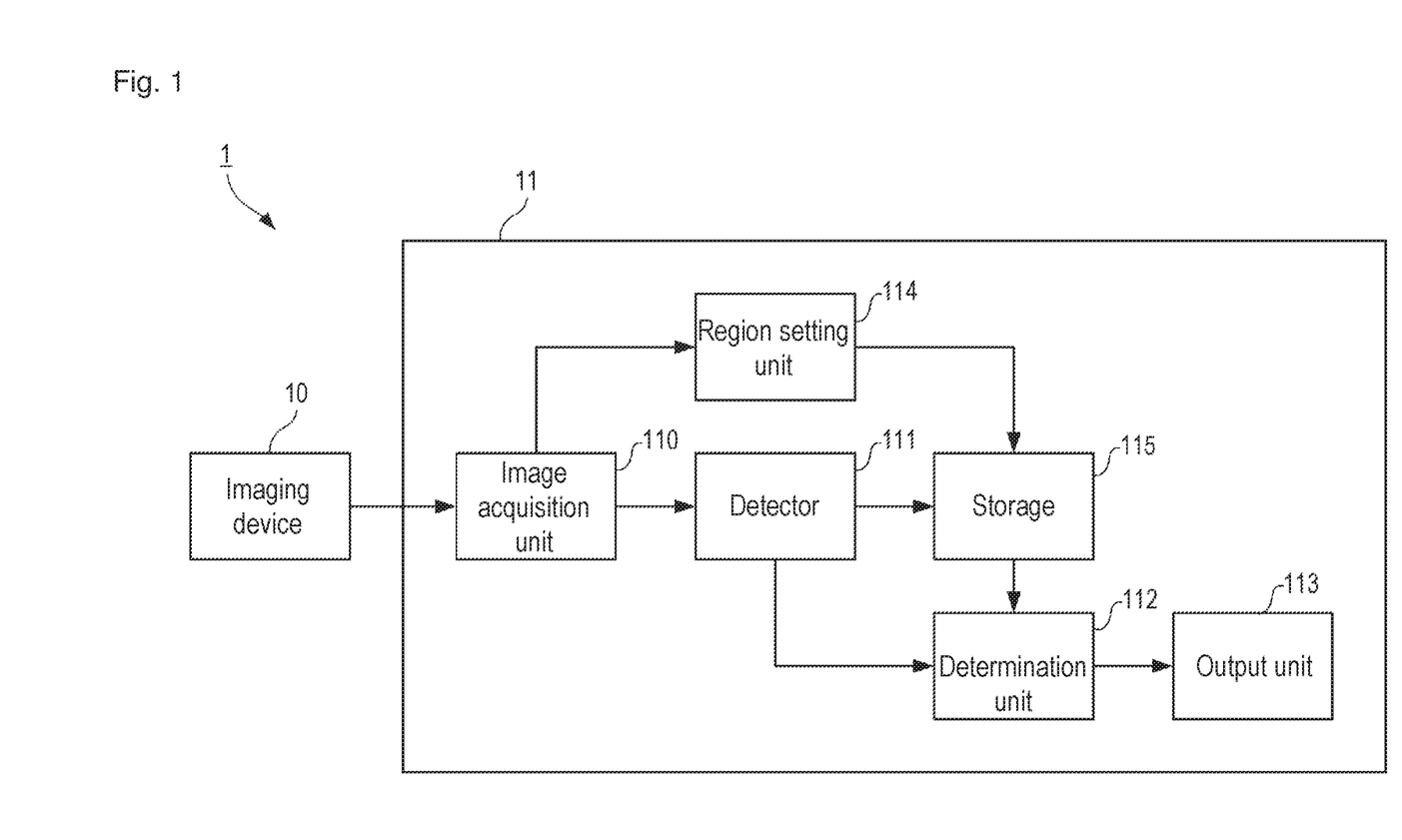
FIG. 1 is a block diagram schematically illustrating a hardware configuration and a functional configuration of a watching assistance system according to a first embodiment.
Figure 2:
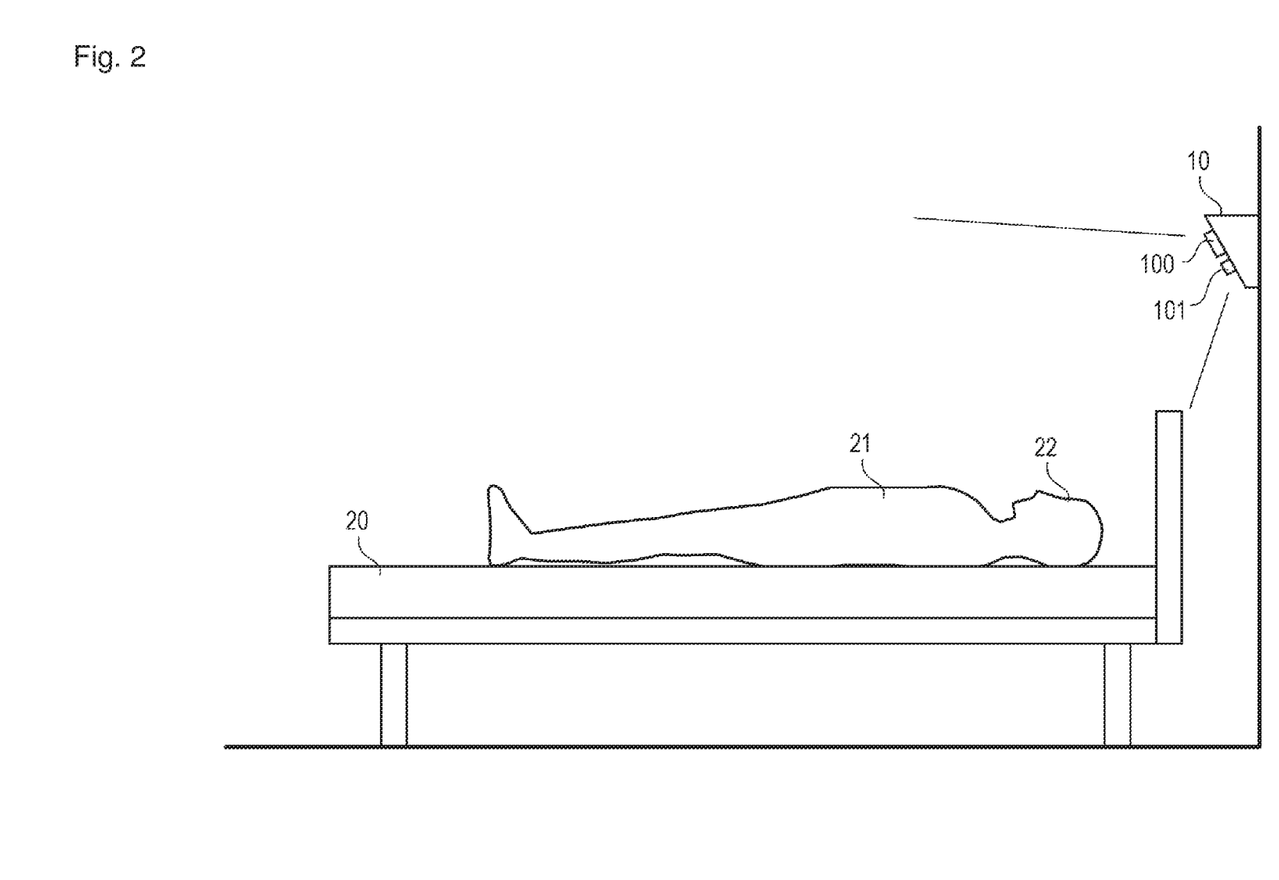
FIG. 2 is a view illustrating an installation example of an imaging device.

First Embodiment (System Configuration) A configuration of a watching assistance system according to a first embodiment of the present invention will be described with reference to FIGS. 1 and 2. FIG. 1 is a block diagram schematically illustrating a hardware configuration and a functional configuration of a watching assistance system 1, and FIG. 2 is a view illustrating an installation example of an imaging device.

The watching assistance system 1 includes an imaging device 10 and an information processing device 11 as a main hardware configuration. The imaging device 10 and the information processing device 11 are connected to each other in a wired or wireless manner. Although only one imaging device 10 is illustrated in FIG. 1, a plurality of imaging devices 10 may be connected to the information processing device 11.

The imaging device 10 is a device that images the subject on the bed to capture image data. A monochrome or color visible light camera, an infrared camera, and the like can be used as the imaging device 10. In the embodiment, the imaging device 10 constructed with an infrared LED illumination 100 and a near infrared camera 101 is used in order to enable the watching over the subject even at night (even when a room is dark). As illustrated in FIG. 2, the imaging device 10 is installed to look over an entire bed 20 from an upper side of a head side of a bed 20 toward a foot side. The imaging device 10 captures an image at predetermined time intervals (for example, 10 fps), and the image data is sequentially captured by the information processing device 11.

The information processing device 11 is a device having a function of analyzing the image data captured from the imaging device 10 in real time, automatically detecting a raising-up action or a getting-out-of-bed action of the subject 21 on the bed 20, and providing notification when it is necessary. The information processing device 11 includes an image acquisition unit 110, a detector 111, a determination unit 112, an output unit 113, a region setting unit 114, and a storage 115 as a specific function. The information processing device 11 of the embodiment includes a CPU (processor), a memory, a storage (such as an HDD and an SSD), an input device (such as a keyboard, a mouse, and a touch panel), an output device (such as a display and a speaker), and a communication interface. The CPU executes a program stored in the storage or the memory to implement each function of the information processing device 11. However, the configuration of the information processing device 11 is not limited to this example. For example, distributed computing may be performed by a plurality of computers, a part of the above functions may be performed by a cloud server, or a part of the above functions may be performed by a circuit such as an ASIC or an FPGA.

The image acquisition unit 110 is a function of acquiring the image captured by the imaging device 10. The image data input from the image acquisition unit 110 is temporarily stored in a memory or a storage, and used in processing of the detector 111 or the determination unit 112.

The detector 111 is a function of analyzing the image acquired by the image acquisition unit 110 to detect a predetermined region (such as a head, a face, and an upper body) of the watching subject 21 from the image. Any method may be adopted as a method for detecting a predetermined region from the image. For example, an object detection algorithm using a technique based on a discriminator in which a classic Haar-like feature quantity or HoG feature quantity is used or a technique in which recent Faster R-CNN is used can preferably be used. The detector 111 of the embodiment detects a head (a part above a neck) 22 of the subject 21 by the discriminator in which the Haar-like feature quantity is used, and outputs a position (x, y) and a size (the numbers of vertical and horizontal pixels) of the head 22 as a detection result. For example, the position (x, y) of the head 22 is represented by an image coordinate of a center point of a rectangular frame surrounding the head 22. The detector 111 of the embodiment outputs the detection result in terms of the position and size of an image coordinate system. Alternatively, the detector 111 may convert the image coordinate system into a spatial coordinate system, and output a three-dimensional position or a three-dimensional size in the spatial coordinate system of the subject 21.

The determination unit 112 is a function of making a raising-up determination or a getting-out-of-bed determination of the subject 21 using a detection result of the detector 111. Specifically, based on the detection position of the head 22, the determination unit 112 determines whether the subject 21 raises oneself up, or whether the subject gets out of the bed. A determination algorithm of the determination unit 112 will be described in detail later.

The output unit 113 is a function of providing necessary notification when the determination unit 112 detects the raising-up action or the getting-out-of-bed action of the subject 21. The output unit 113 switches necessity (for example, provides notification only in the case of the dangerous state) of the notification, a notification content (for example, a content of a message), notification means (for example, a voice, a mail, a buzzer, or a warning light), a notification destination (for example, a nurses or a doctor), a notification frequency, and the like according to the danger degree of the action of the subject 21.

The region setting unit 114 is a function of setting a determination region to the image captured by the imaging device 10. In order to monitor the state of the subject 21 on the bed 20, the watching assistance system 1 sets the determination region based on the region of the bed 20 in the image. The bed region may manually or automatically be set. For the manual setting, the region setting unit 114 may provide a user interface that allowing a user to input a bed region or the determination region in the image. For the automatic setting, the region setting unit 114 may detect the bed region from the image by object recognition processing.

The storage 115 is a function of storing various data used in the processing by the watching assistance system 1. A storage area is provided in the storage 115 in order to store at least various parameters (such as a threshold) used in the raising-up action or the getting-out-of-bed action, the setting information about a criterion, setting information about the determination region, image data of a plurality of past frames, or a detection result (used to calculate of the moving speed or the moving direction).

(Setting of Determination Region)

Figure 3:
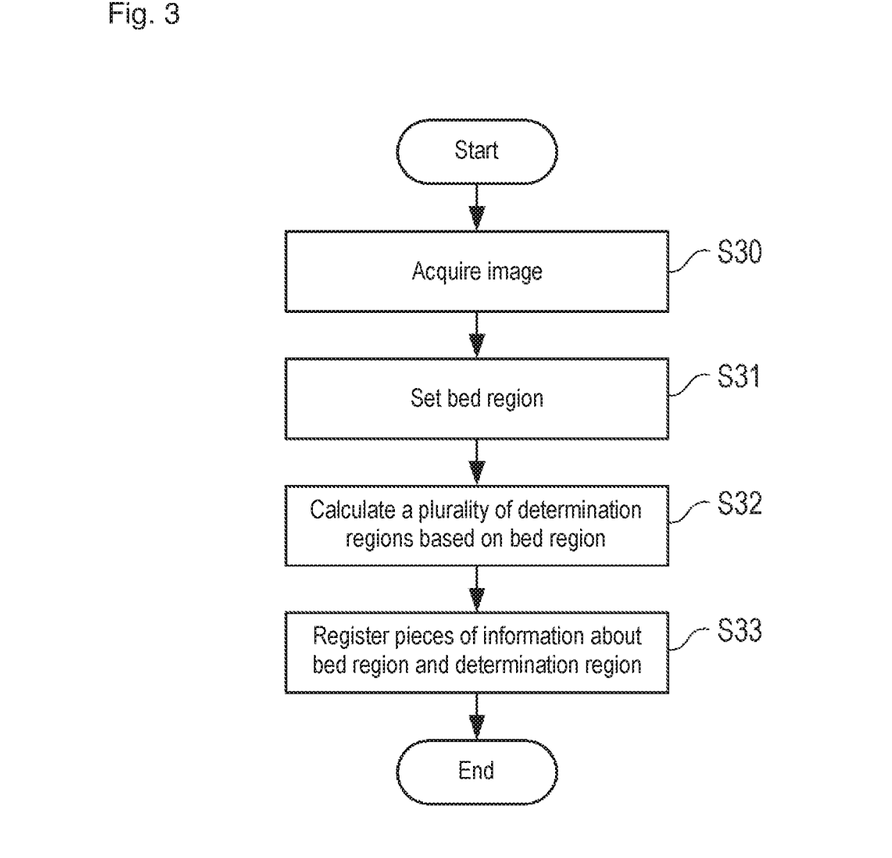
FIG. 3 is a flowchart illustrating processing of setting a determination region.
Figure 4:
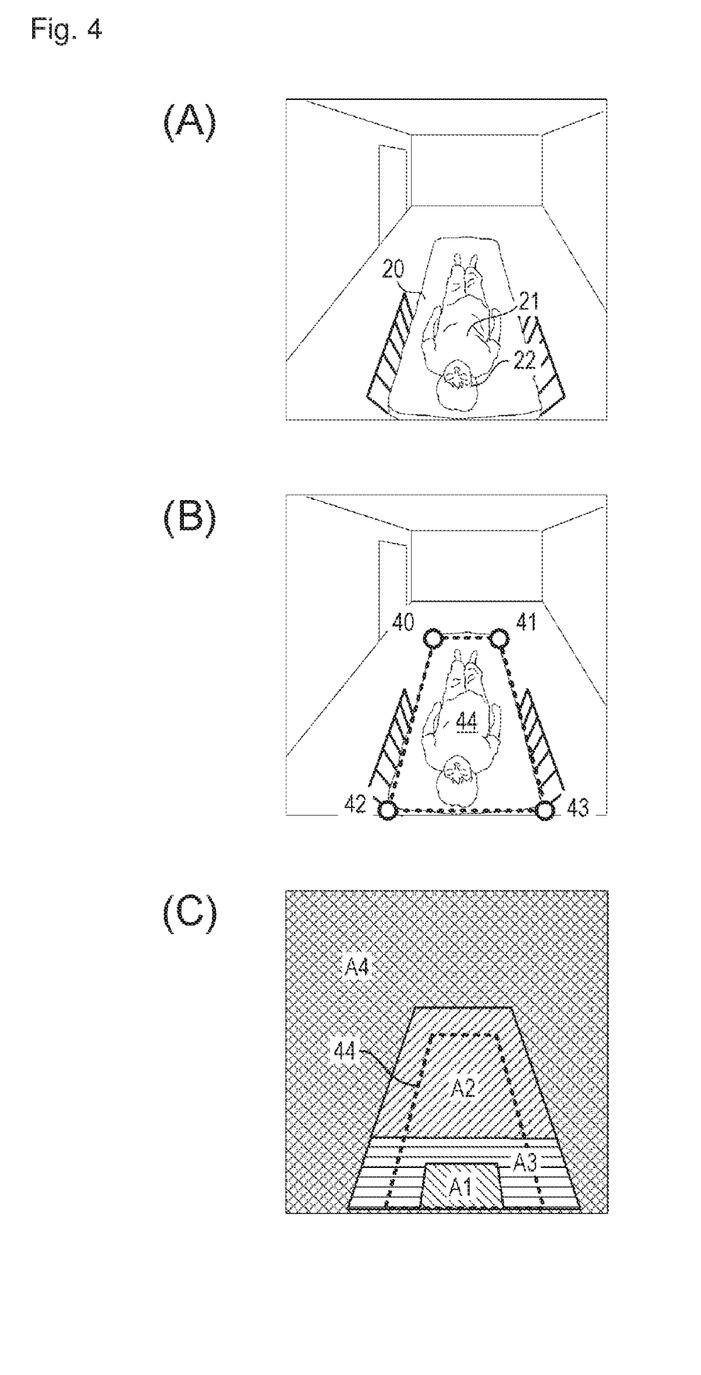
FIGS. 4A to 4C illustrate examples of the determination region set to an image.

An example of determination region setting processing will be described with reference to FIGS. 3, 4A to 4C. FIG. 3 is a flowchart of the determination region setting processing performed by the information processing device 11, and FIGS. 4A to 4C illustrate examples of the determination region set to the image. The determination region setting processing is performed when the determination region is not set (for example, at time of installation of the watching assistance system 1) or when the determination region needs to be updated with the movement of the bed or the imaging device 10.

In step S30, the image acquisition unit 110 acquires the image from the imaging device 10 (FIG. 4A). In step S31, the region setting unit 114 causes the user to input points 40 to 43 at the four corners of the bed, or automatically detects input points 40 to 43, and sets a quadrangle surrounded by the four points 40 to 43 in a bed region 44 (FIG. 4B). In step S32, the region setting unit 114 sets determination regions A1 to A4 based on the bed region 44 (FIG. 4C).

The determination region A1 is a region set onto the head side of the bed 20, and corresponds to a range where the head 22 of the subject 21 may exist at a lying time (when the subject 21 lies in the bed 20) (hereinafter, referred to as lying region A1). The determination region A2 is a region set onto the foot side of the determination region A1, and corresponds to a range where the head 22 of the subject 21 may exist at a raising-up time (when the subject 21 raises an upper half of the body) (hereinafter, referred to as raising-up region A2). At this point, the lying region A1 and the raising-up region A2 are disposed at a predetermined interval A3. The interval A3 is a margin provided to prevent the false alarm in the case that the head 22 of the subject 21 is located between the lying region A1 and the raising-up region A2 (hereinafter, referred to as a margin region A3). In the first embodiment, positions and sizes of the regions A1 to A3 relative to the bed region 44 are previously determined, and the ranges of the regions A1 to A3 are determined by calculation when the bed region 44 is specified. The region A4 is a region except for the regions A1 to A3. When the subject 21 gets out of the bed (when the subject 21 is away from the bed), the head 22 of the subject 21 exists in the region A4 (hereinafter referred to as the getting-out-of-bed region A4).

In step S33, the region setting unit 114 stores the information about the bed region 44 (such as the coordinates of the four corners of the bed region 44) and the information about the regions A1 to A4 (such as the coordinates of an apex of each region) in the storage 115. Then, the setting processing is ended.

(Raising-Up Determination Processing)

Figure 5:
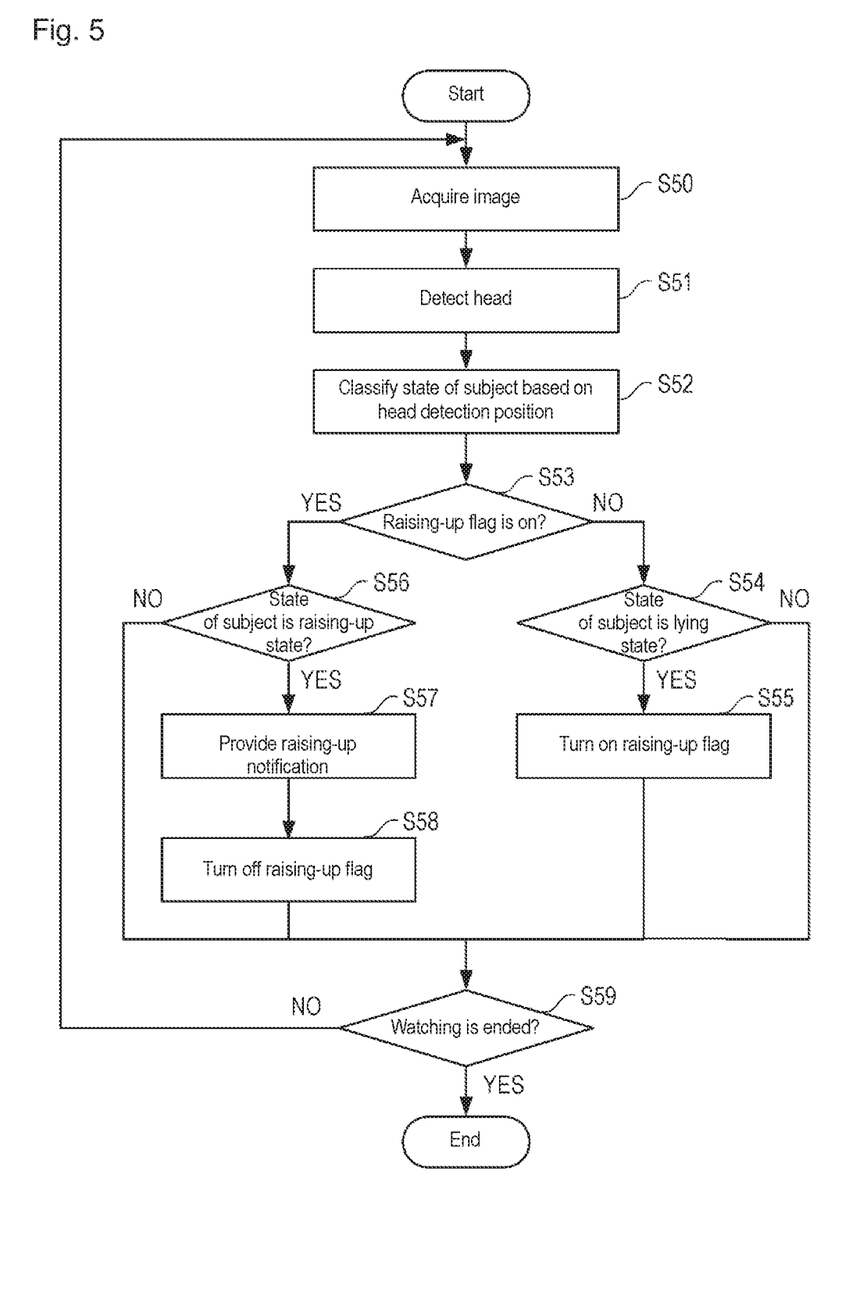
FIG. 5 is a flowchart illustrating raising-up determination processing of the first embodiment.

An example of the raising-up determination processing of the first embodiment will be described with reference to FIG. 5. FIG. 5 is a flowchart of raising-up determination processing of the first embodiment performed by the information processing device 11. The processing flowchart in FIG. 5 is performed each time the image of one frame is captured from the imaging device 10.

In step S50, the image acquisition unit 110 acquires the image of one frame from the imaging device 10. The acquired image is temporarily stored in the storage 115. Subsequently, the detector 111 detects the head of the subject from the image acquired in step S50 (step S51). Information about the detected head position (xy coordinate) is stored in the storage 115 while correlated with time information about the image or a frame number of the image.

The determination unit 112 determines which one of the regions A1 to A4 the detected position of the head belongs to, and classifies the state of the subject (step S52). At this point, the case that the head is detected in the lying region A1 is referred to as a "lying state", the case that the head is detected in the raising-up region A2 is referred to as a "raising-up state", and the case that the head is detected in the margin region A3 is referred to as a "transition state", and the case that the head is detected in the getting-out-of-bed region A4 is referred to as "getting-out-of-bed state".

Subsequently, the determination unit 112 checks whether a raising-up flag is on or off (step S53). The processing proceeds to step S54 when the raising-up flag is off, and the processing proceeds to step S56 when the raising-up flag is on. The raising-up flag is a flag for switching on and off of the raising-up determination function, and the initial value (during starting of the system) of the raising-up flag is off.

When the raising-up flag is off (NO in step S53), the determination unit 112 checks whether the state of the subject determined in step S52 is the "lying state" (step S54). and the "bed-up state" In the case, the determination unit 112 sets the raising-up flag to on when the state of the subject is the "lying state" (step S55). That is, the raising-up determination function is turned on with the detection of the head of the subject in the lying region A1 as a trigger. Subsequently, the processing proceeds to step S59.

On the other hand, when the raising-up flag is on in the determination of step S53, the determination unit 112 determines whether the state of the subject determined in step S52 is the "raising-up state" (step S56). When the subject is not in the "raising-up state" (NO in step S56), namely, when the head of the subject is located in the lying region A1 or between the lying region A1 and the raising-up region A2, the raising-up determination is skipped, and the processing proceeds to step S59. For the "raising-up state" (YES in step S56), namely, when the head of the subject is located in the raising-up region A2, the determination unit 112 determines that the subject performs the raising-up action, and the output unit 113 provides the raising-up notification (step S57). After the raising-up notification is provided, the determination unit 112 resets the raising-up flag to off, and turns off the raising-up determination function (step S58), and the processing proceeds to step S59. In step S59, whether the watching processing is continued or ended is determined. When the watching processing is continued (NO in step S59), the processing returns to step S50 to perform the processing of the next frame. When the watching is ended (YES in step S59), the processing is ended.

In the first embodiment, the margin region A3 is provided between the lying region A1 and the raising-up region A2, and the raising-up notification is provided only when the condition that the head is detected in the raising-up region A2 after the head of the subject is detected in the lying region A1 is satisfied, so that the generation of the unnecessary raising-up notification can be prevented. For example, even if the head position frequently comes and goes between the lying region A1 and the margin region A3 while the head just exists on the boundary line of the lying region A1, this is not determined to be the raising-up action, so that the raising-up notification is not provided. When the head position enters the raising-up region A2 to provide the raising-up notification, the raising-up flag is turned off, so that the raising-up determination function does not work unless the subject becomes the raising-up state again (unless the head position returns to the lying region A1). Thus, as compared to the conventional system, the false alarm of the raising-up notification can be prevented and the reliability of the raising-up determination can be improved.

Second Embodiment

Figure 6:
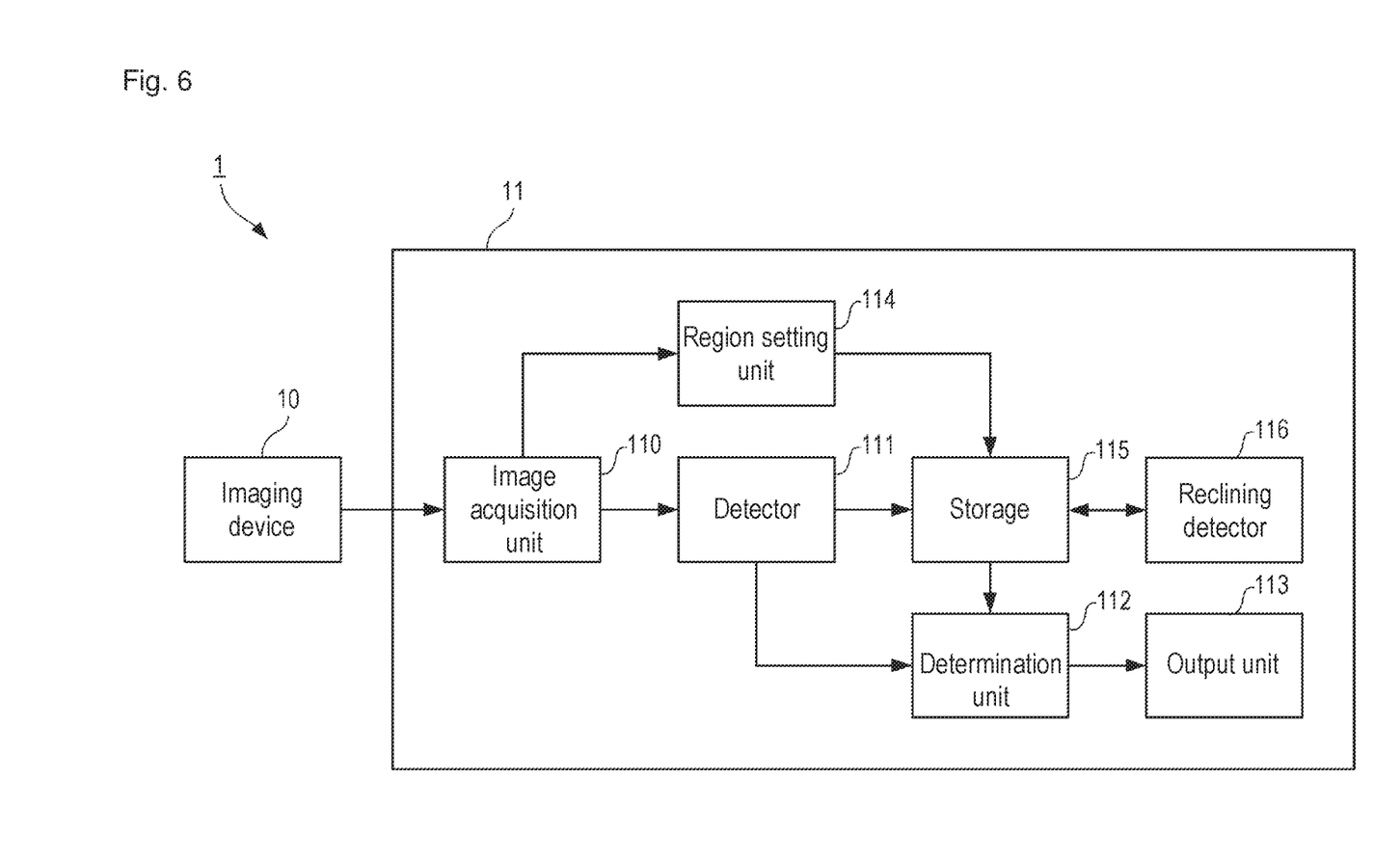
FIG. 6 is a block diagram schematically illustrating a hardware configuration and a functional configuration of a watching assistance system according to a second embodiment.

FIG. 6 illustrates a configuration of a watching assistance system 1 according to a second embodiment of the present invention. The basic configuration of the second embodiment is the same as that of the first embodiment (see FIG. 1) except that a reclining detector 116 is added. The reclining detector 116 is a function of detecting that a reclining angle of the bed is changed. One of the features of the watching assistance system 1 of the second embodiment is that the watching assistance system 1 has a function of changing the settings of the determination regions A1 to A4 according to the reclining of the bed (hereinafter, referred to as "reclining correction").

Figure 7:
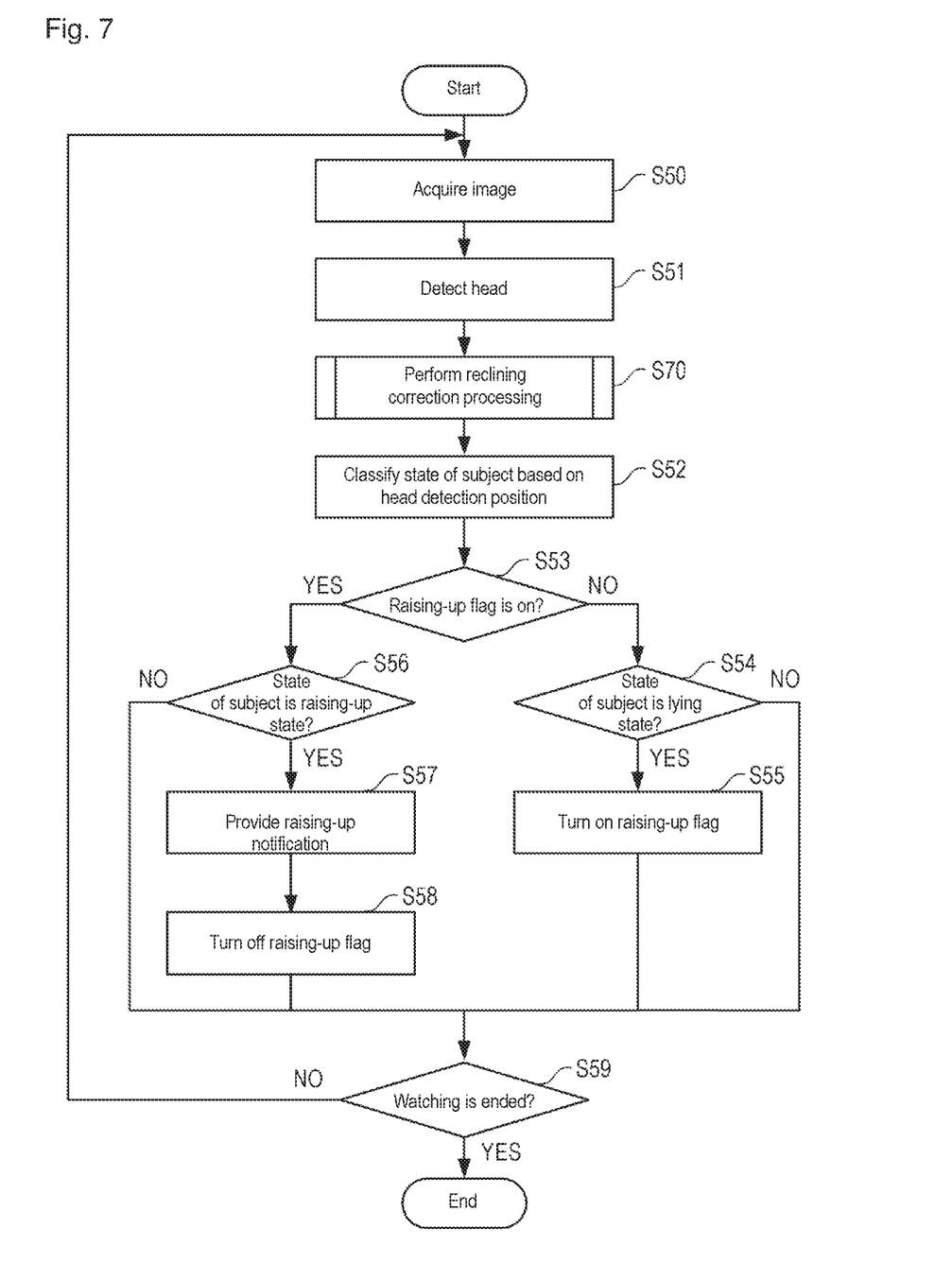
FIG. 7 is a flowchart illustrating raising-up determination processing of the second embodiment.
Figure 8:
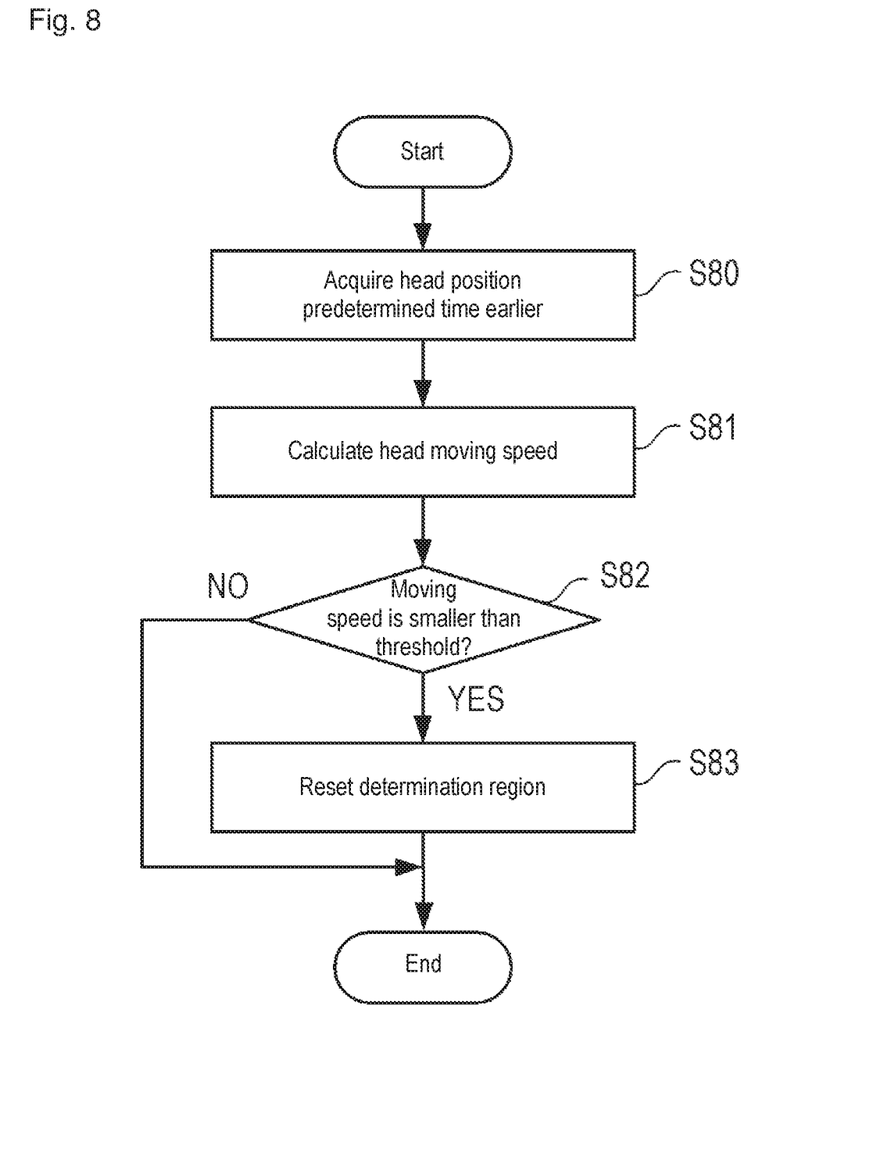
FIG. 8 is a flowchart illustrating reclining correction processing of the second embodiment.

An example of the raising-up determination processing of the second embodiment will be described with reference to FIGS. 7 and 8. FIG. 7 illustrates a flowchart of the raising-up determination processing of the second embodiment. The raising-up determination processing of the second embodiment differs from the raising-up determination processing (see FIG. 5) of the first embodiment in that reclining correction processing (step S70) is added. FIG. 8 is a detailed flowchart illustrating the reclining correction processing of the second embodiment.

The reclining detector 116 reads information about the head position in the image of a predetermined time earlier (for example, several frames earlier) from the storage 115 (step S80). Subsequently, the reclining detector 116 calculates the moving speed of the head in the upward direction (raising-up direction) based on the head position of the predetermined time earlier and the current head position detected in step S51 (step S81).

The raising-up action of the subject and the change in reclining angle of the bed are assumed as the case that the head moves upward. For the raising-up action, the moving speed of the head is relatively fast, and the moving speed and moving direction are not constant. On the other hand, for the change in reclining angle, the moving speed of the head is relatively slow, and the moving speed and the moving direction are substantially constant. When attention is focused on such points, the reclining detector 116 of the second embodiment determines that the reclining angle is changed when the moving speed of the head is smaller than to predetermined threshold (YES in step S82), and the processing proceeds to step S83.

In step S83, the region setting unit 114 resets the regions A1 to A4 according to the bed region after the angle change. The resetting may be performed by any method. For example, the region setting unit 114 detects the bed region from the current image (a vertical width of the bed decreases in the case that the backrest of the bed is raised), and the positions and sizes of the lying region A1, the raising-up region A2, and the margin region A3 may be set based on the current bed region. Alternatively, the region setting unit 114 may move or deform the regions A1 to A4 according to a movement amount of the head. For example, the upper boundary line of the lying region A1 and the lower boundary line of the raising-up region A3 may be translated in the upward direction of the image by the same amount as the movement of the head while the interval between the upper boundary line and the lower boundary line is kept constant. After the regions A1 to A4 are reset as described above, the processing proceeds to step S52.

In the method of the second embodiment described above, the change in reclining angle of the bed is automatically detected, and the lying region A1, the raising-up region A2, and the margin region A3 are reset to the proper positions and sizes. Thus, the high-reliability raising-up determination can be made regardless of the reclining state of the bed, and the false alarm of the raising-up notification caused by reclining can be prevented.

In the second embodiment, the change in reclining angle is determined in the case that the condition that the moving speed of the head is smaller than the threshold is satisfied. Alternatively, the reclining may be detected by another condition determination. For example, the change in reclining angle may be determined in the case that the moving speed and/or the moving direction of the head is substantially kept constant.

Third Embodiment

In the second embodiment, the reclining is detected based on the moving speed or the moving direction of the head. In a third embodiment, the reclining is detected based on a contour shape of the bed detected from the image. The basic configuration of the system is identical to that of the second embodiment (see FIG. 6), but the third embodiment differs from the second embodiment in the action of the reclining detector 116.

Figure 9:
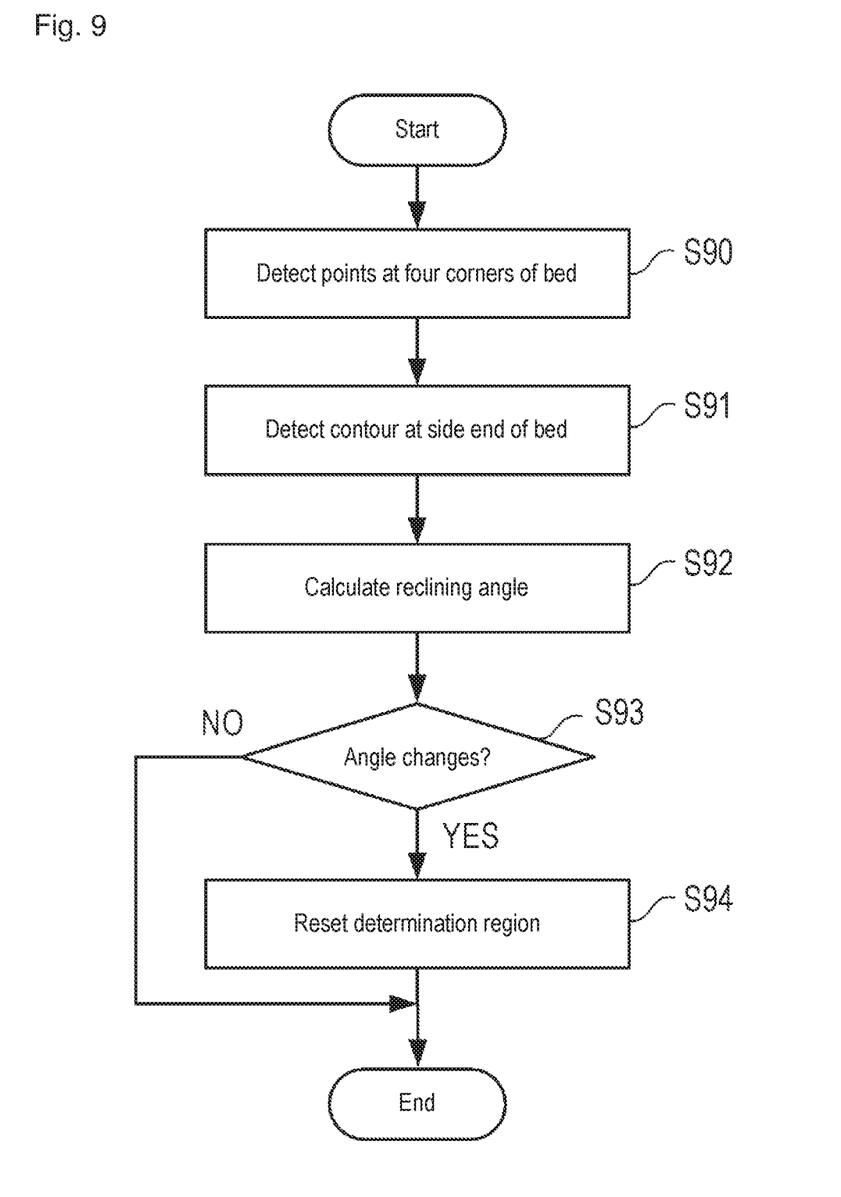
FIG. 9 is a flowchart illustrating reclining correction processing according to a third embodiment.
Figure 10:
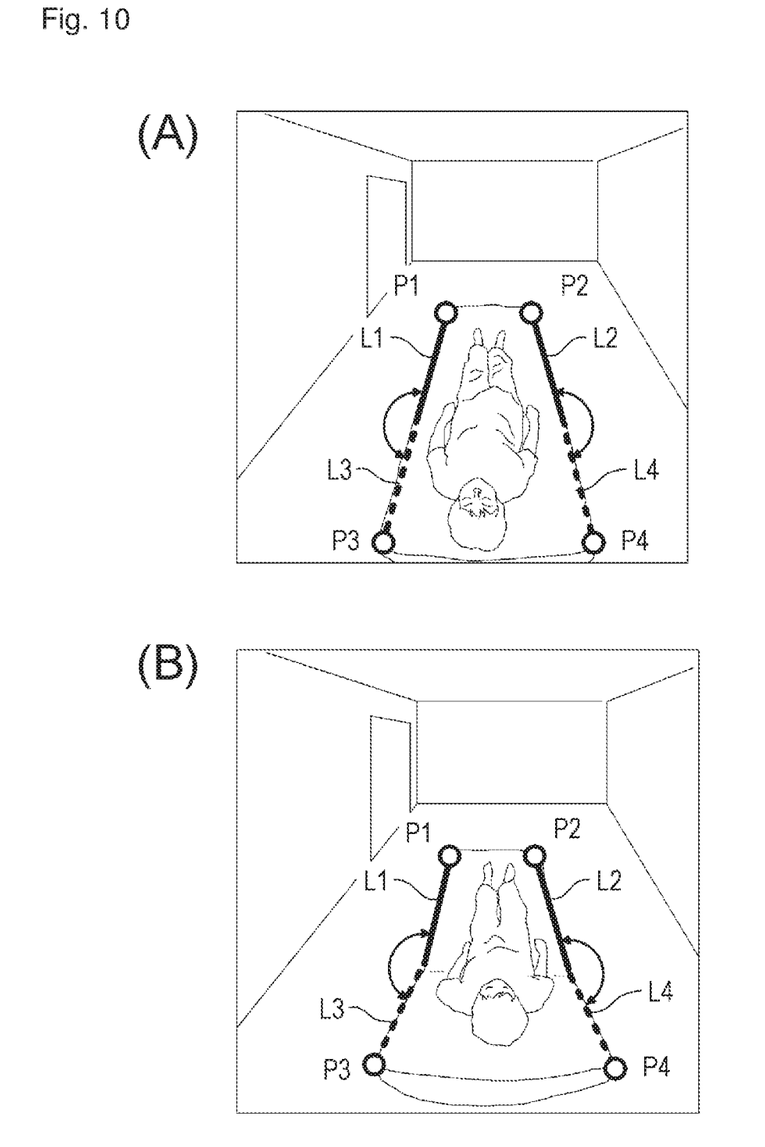
FIG. 10A illustrates an example of an image in which a bed is in a flat state.
FIG. 10B illustrates an example of an image in which a backrest of a bed is raised.

The reclining correction processing of the third embodiment will be described with reference to FIGS. 9, 10A, and 10B. FIG. 9 is a detailed flowchart illustrating the reclining correction processing of the third embodiment, and corresponds to the processing in step S70 of the raising-up determination processing in FIG. 7. FIG. 10A illustrates an example of the image in a flat bed state, and FIG. 10B illustrates an example of the image in a state in which a backrest of the bed is raised.

In the flowchart of FIG. 9, the reclining detector 116 detects points P1 to P4 at the four corners of the bed from the current image (step S90). Any method such as template matching and image recognition using a discriminator that learns from the image of a corner portion of the bed may be used as a method for detecting the four corners. Subsequently, the reclining detector 116 detects a contour at a side end of the bed from the image (step S91). For example, the reclining detector 116 detects line segments L1, L2 extending in the downward direction of the image from the points P1, P2 on the foot side of the bed, and detects the line segments L3, L4 extending in the upward direction of the image from the points P3, P4 on the head side of the bed. For example, a Hough transform can be used as the method for detecting a line segment.

Subsequently, the reclining detector 116 calculates the angle between the line segments L1 and L3 and the angle between the line segments L2 and L4 (step S92). The angle is about 180 degrees in the case that the bed is flat as illustrated in FIG. 10A, and the angle is smaller than 180 degrees in the case that the backrest of the bed is raised as illustrated in FIG. 10B. For this reason, in the case that at least one of the angles calculated in step S92 is smaller than a predetermined threshold (for example, 170 degrees), the reclining detector 116 determines that the reclining angle is changed (YES in step S93), and the processing proceeds to step S94.

In step S94, the region setting unit 114 resets the regions A1 to A4 according to the region of the bed after the change in angle. The specific resetting method is similar to step S84 of the second embodiment. After the regions A1 to A4 are reset, the processing proceeds to the processing in step S52.

In the method of the second embodiment described above, the change in reclining angle of the bed is automatically detected, and the lying region A1, the raising-up region A2, and the margin region A3 are reset to the proper positions and sizes. Thus, the high-reliability raising-up determination can be made regardless of the reclining state of the bed, and the false alarm of the raising-up notification caused by reclining can be prevented.

In the third embodiment, in the case that the condition that the reclining angle is smaller than the threshold is satisfied, the change in reclining angle is determined (that is, the reclining angle is different from that of the default flat state). Alternatively, the reclining may be detected by another condition determination. For example, the change in reclining angle may be determined in the case that a difference between the angle in setting the determination region and the angle detected from the latest image is larger than a predetermined threshold.

<Others>

The descriptions of the embodiments merely illustrate the present invention. The present invention is not limited to the above specific aspects, but various modifications can be made without departing from the scope of the technical idea thereof. For example, the shapes of the lying region A1 and the raising-up region A2 may not have the rectangular shape. Although the head is the detection target in the embodiments, a region (such as a face, a part (facial organ) of the face, and an upper body) except for the head may be the detection target.

DESCRIPTION OF SYMBOLS 1 watching assistance system
10 imaging device
11 information processing device
110 image acquisition unit
111 detector
112 determination unit
113 output unit
114 region setting unit
115 storage
116 reclining detector
100 illumination
101 near infrared camera
20 bed
21 subject
22 head
40 to 43 four corners of bed
44 bed region
A1 lying region
A2 raising-up region
A3 margin region
A4 getting-out-of-bed region

The invention claimed is:

1. A watching assistance system that assists watching over a subject on a bed, the watching assistance system comprising:
an information processing device having a processor coupled to a memory, wherein the information processing device:
acquires an image captured by a camera connected to the information processing device;
detects a position of a head of the subject from the acquired image;
determines whether the subject raises oneself up based on the detected position of the head of the subject,
provides a notification when the subject is determined to raises oneself up,
wherein based on a bed region in the acquired image, the information processing device sets a first region to an existing range of a head in a lying status, and a second region to an existing range of the head in a sitting-up status, and a margin region is between the first region and the second region, and
the information processing device sets a flag to ON when the flag is in an OFF state and the head of the subject is detected in the first region, and determines that the subject raises oneself up and sets the flag to OFF when the flag is an ON state and the head of the subject is detected in the second region.

2. The watching assistance system according to claim 1, wherein the information processing device:
detects that a change in a reclining angle of the bed; and
changes settings of the first region, the second region, and the margin region according to the bed region after the change in the reclining angle when the information processing device detects the change in the reclining angle.

3. The watching assistance system according to claim 2, wherein the information processing device determines the change in the reclining angle when movement of the head of the subject satisfies a predetermined condition.

4. The watching assistance system according to claim 2, wherein the information processing device determines the change in the reclining angle when a contour shape of the bed changes.

5. A method for controlling a watching assistance system that assists watching over a subject on a bed, the watching assistance system control method comprising:
- acquiring, by a processor coupled to a memory, an image captured by a camera connected to the processor;
- detecting, by the processor, a position of a head of the subject from the acquired image;
- determining, by the processor, whether the subject raises oneself up based on the detected position of the head of the subject;
- providing, by the processor, notification when the determination that the subject raises oneself up is made;
- setting, by the processor based on a bed region in the acquired image, a first region to an existing range of a head in a lying status, and a second region to an existing range of the head in a sitting-up status, and a margin region between the first region and the second region, and
- in the determination, a flag is set to ON when the flag is in an OFF state and the head of the subject is detected in the first region, the determination that the subject raises oneself up is made and the flag is set to OFF when the flag is an ON state and the head of the subject is detected in the second region.

6. A non-transitory computer readable medium storing a program causing a computer coupled to the processor to perform the watching assistance system control method according to claim 5.

* * * * *